US008463286B2

(12) United States Patent
Maranhas et al.

(10) Patent No.: US 8,463,286 B2
(45) Date of Patent: Jun. 11, 2013

(54) SYSTEMS AND METHODS FOR ACCESSING TRAVEL SERVICES USING A PORTABLE ELECTRONIC DEVICE

(75) Inventors: Jeff Maranhas, San Jose, CA (US);
Stanley Carl Ng, Los Altos, CA (US);
Courtnee Westendorf, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 405 days.

(21) Appl. No.: 12/642,125

(22) Filed: Dec. 18, 2009

(65) Prior Publication Data

US 2010/0190510 A1 Jul. 29, 2010

Related U.S. Application Data

(60) Provisional application No. 61/147,644, filed on Jan. 27, 2009.

(51) Int. Cl.
*H04W 24/00* (2009.01)

(52) U.S. Cl.
USPC ............... 455/456.1; 455/418; 455/456.2; 455/456.3

(58) Field of Classification Search
USPC ... 455/456.1, 456.2, 456.3, 456.4, 466; 705/6
See application file for complete search history.

(56) References Cited

U.S. PATENT DOCUMENTS

| 5,390,281 | A | 2/1995 | Luciw et al. |
| 5,434,777 | A | 7/1995 | Luciw |
| 5,457,476 | A | 10/1995 | Jenson |
| 5,477,447 | A | 12/1995 | Luciw et al. |
| 5,608,624 | A | 3/1997 | Luciw |
| 5,621,903 | A | 4/1997 | Luciw et al. |
| 5,625,814 | A | 4/1997 | Luciw |
| 5,634,100 | A | 5/1997 | Capps |
| 5,644,735 | A | 7/1997 | Luciw |
| 5,721,845 | A | 2/1998 | James et al. |
| 5,864,844 | A | 1/1999 | James et al. |
| 5,978,766 | A | 11/1999 | Luciw |
| 5,982,352 | A | 11/1999 | Pryor |
| 7,454,203 | B2 | 11/2008 | Levitan |
| 8,073,590 | B1 * | 12/2011 | Zilka ............................. 701/36 |
| 2005/0114014 | A1 | 5/2005 | Isaac |
| 2005/0136988 | A1 | 6/2005 | Villamil et al. |
| 2006/0172709 | A1 | 8/2006 | Eyer et al. |
| 2007/0072631 | A1 | 3/2007 | Mock et al. |
| 2008/0046298 | A1 * | 2/2008 | Ben-Yehuda et al. ............ 705/6 |
| 2008/0167036 | A1 | 7/2008 | Bush et al. |
| 2008/0191009 | A1 * | 8/2008 | Gressel et al. ................ 235/382 |

(Continued)

OTHER PUBLICATIONS

"GUIDEYOU Amsterdam" by Comma Publications GmbH & Co. KG, http://itunes.apple.com/us/app/guideyou-amsterdam/id291071740?mt=8, accessed Aug. 12, 2010.

(Continued)

*Primary Examiner* — Kathy Wang-Hurst
(74) *Attorney, Agent, or Firm* — Novak Druce Connolly Bove + Quigg LLP

(57) ABSTRACT

This is directed to systems and methods for integrating travel services in a single application available to a portable electronic device. Using the single application, a user can access and control travel services before arriving at the initial location of travel, on arriving at the initial location of travel, during travel, and after travel. Such services can include, for example, reserving a travel itinerary, checking-in remotely for a reservation, providing airport information, providing for social networking, obtaining dining or entertainment during travel, controlling and requesting cabin services, providing arrival notifications to third parties, providing destination location information, and the like.

21 Claims, 10 Drawing Sheets

U.S. PATENT DOCUMENTS

| | | | | |
|---|---|---|---|---|
| 2008/0299957 | A1* | 12/2008 | Zellner | 455/414.3 |
| 2009/0005071 | A1 | 1/2009 | Forstall et al. | |
| 2010/0069054 | A1 | 3/2010 | Labidi et al. | |
| 2010/0078475 | A1 | 4/2010 | Lin et al. | |
| 2010/0191551 | A1 | 7/2010 | Drance et al. | |
| 2011/0263247 | A1* | 10/2011 | Smelov et al. | 455/432.1 |

OTHER PUBLICATIONS

"Sudoku (Free)" by Mighty Mighty Good Games, http://itunes.apple.com/us/app/sudoku-free/id285755462?mt=8, accessed Aug. 12, 2010.

"Travelocity" by Travelocity, http://itunes.apple.com/us/app/travelocity/id284803487?mt=8, accessed Aug. 12, 2010.

"TravelTracker—Personal Travel Assistant" by Silverware Software, http://itunes.apple.com/us/app/traveltracker-personal-travel/id284918921?mt=8, Accessed Aug. 12, 2010.

"Where To?—GPS points of interest" by FutureTap, http://itunes.apple.com/us/app/where-to-gps-points-interest/id314785156?mt=8, accessed Aug. 12, 2010.

* cited by examiner

SYSTEMS AND METHODS FOR ACCESSING TRAVEL SERVICES USING A PORTABLE ELECTRONIC DEVICE

CROSS-REFERENCE TO RELATED APPLICATIONS

This application claims the benefit of U.S. Provisional Patent Application No. 61/147,644, filed on Jan. 27, 2009, which is hereby incorporated by reference herein in its entirety.

FIELD OF THE DISCLOSURE

This is directed to providing access to travel services using a portable electronic device.

BACKGROUND OF THE DISCLOSURE

As travelers use airplanes, trains, buses, and various other travel or transportation services, many interactions between the travelers and the travel service providers can take place. For example, a traveler can interact with an airline to make a reservation, check-in for a reserved flight, obtain pre-flight amenities at the airport, obtain in-flight amenities, and obtain post-flight amenities. All of these interactions can require distinct actions from the user from different devices or elements. For example, a user can call to make a reservation, check-in in person upon reaching the airport, identify airport attractions from a telephone or during an in-person conversation with an airline attendant at the airport, order entertainment or food using a menu available from a television screen or printed menu on the airplane, and gain frequent-flier miles by receiving a receipt after the flight or by entering the necessary information on-line.

Although this combination of approaches for interacting with the airline, or any other travel service provider, and with the available travel services can be serviceable, it remains cumbersome and requires the travel service provider to accommodate all of the possible forms of interaction. From a user's perspective, the lack of centralization of interactions with the travel service provider and with the available travel services can require more effort from the user wishing to take advantage of travel services, and perhaps even dissuade the user from using available travel provider services (thus at a cost to the travel service provider).

SUMMARY OF THE DISCLOSURE

This is directed to systems and methods for providing an integrated application for accessing travel services using portable electronic devices.

The electronic device may include an integrated application operative to interface with a travel system to provide access to different services provided by a travel service provider (e.g., an airline, railroad company, bus company, etc.). For example, the integrated application can connect to an airline registration system to allow a user to check-in remotely (e.g., from a taxi on the way to the airport). As another example, the integrated application can provide an arrival notification of a user's arrival to a third party upon the user's arrival at a destination (e.g., when the user's airplane lands). As another example, the integrated application can allow the user to access services available to airline customers, such as airport gate services (e.g., preferred guest lounge and available restaurant options), in-flight services (e.g., in-flight dining and entertainment options), or other services for enhancing a user's airline experience.

The electronic device can interface with the travel system using any suitable approach. In some embodiments, the electronic device can securely connect to one or more servers associated with the travel service provider. For example, the electronic device can connect with distinct servers associated with ordering services or goods from the travel service provider (e.g., train tickets, in-flight entertainment, and the like). As another example, the electronic device can connect with distinct servers associated with attractions or shops proximate the travel service (e.g., restaurants and shops in the airport terminal) for which the user can make reservations, purchases, or access information (e.g., buy a pass for an airline's airport lounge).

In some embodiments, the integrated application can allow a user to access resources to plan a travel itinerary. For example, a user can research potential itineraries, research potential destinations, book a travel reservation, access and modify a booked travel reservation, enter frequent flier information, and receive special offers and promotions.

In some embodiments, the integrated application can allow a user to request upgrades, to check-in remotely, and to enter user preferences. Based on the user preferences, promotions, offers, and upgrades can be presented to the user (e.g., by matching the user preferences to available promotions, offers, and upgrades). Moreover, when a user is at a travel service provider (e.g., at an airport), the integrated application can provide a user with maps of the facilities (e.g., through an integrated or associated mapping application), alert a user of nearby restaurants, shops, and other services, and provide a user with coupons or offers associated with the nearby services. In some embodiments, the electronic device can function as a key to access certain goods or services provided by the travel service provider (e.g., a key to access to an airline's airport lounge, a ticket to board a train, etc.). In some embodiments, the integrated application can help a user find nearby acquaintances or otherwise provide social networking functions.

In some embodiments, the integrated application can control connectivity to in-flight entertainment offered by the travel service provider (e.g., control power, audio, and video available at the traveler's seat, such as from a video console located in the headrest in front of the traveler's seat). In some embodiments, the integrated application can allow a user to access entertainment (e.g., games, movies, music, or other entertainment) directly on their electronic device. Moreover, a user can control aspects of their seating area such as seat adjustments, lighting, air temperature, audio volume, radio channel, television channel, or other aspects through the integrated interface.

In some embodiments, the integrated application can provide arrival notifications. For example, the integrated application can determine the user's airplane has landed, and may then send a notification of the user's arrival to a third party (e.g., to friends or family awaiting the arrival of the user). To determine the user's airplane has landed, the integrated application may determine the electronic device was powered off and then powered back on (e.g., as the electronic device may have been turned off while the airplane was in flight).

In some embodiments, the integrated application can provide post-flight functions for the user such as providing destination information, providing transportation information, providing bounceback and affiliate offers, and storing receipts of associated travel expenses for the user.

BRIEF DESCRIPTION OF THE DRAWINGS

The above and other features of the invention, its nature and various advantages will be more apparent upon consideration of the following detailed description, taken in conjunction with the accompanying drawings in which.

DETAILED DESCRIPTION

Figure 1:
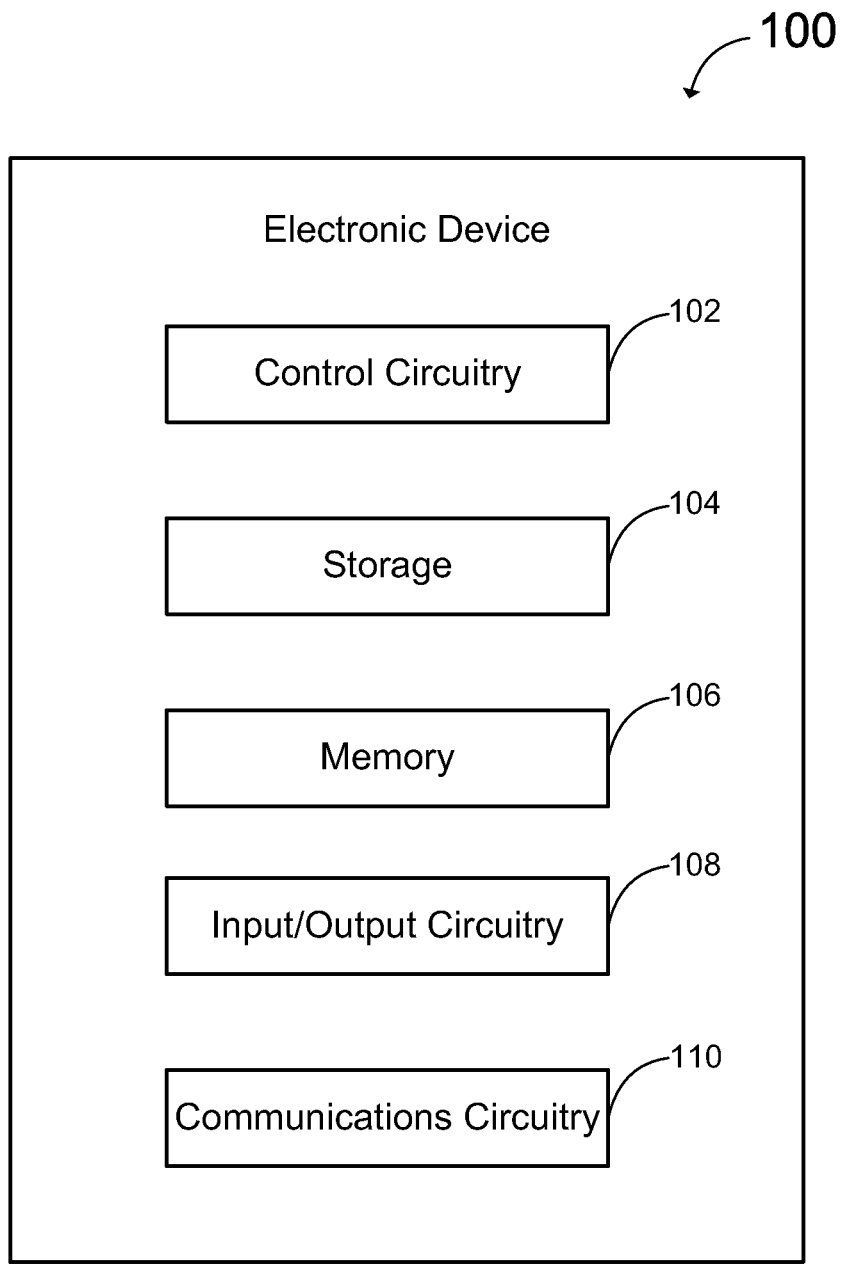
FIG. 1 is a schematic view of an illustrative electronic device for providing an application operative to interface with a travel system in accordance with some embodiments of the invention.

FIG. 1 is a schematic view of an illustrative electronic device for providing an application operative to interface with a travel system in accordance with some embodiments of the invention. Electronic device 100 can include control circuitry 102, storage 104, memory 106, input/output ("I/O") circuitry 108, and communications circuitry 110. In some embodiments, one or more of the components of electronic device 100 can be combined or omitted (e.g., storage 104 and memory 106 may be combined). In some embodiments, electronic device 100 can include other components not combined or included in those shown in FIG. 1 (e.g., motion detection components, a power supply such as a battery or kinetics, a display, bus, a positioning system, a camera, an input mechanism, etc.), or several instances of the components shown in FIG. 1. For the sake of simplicity, only one of each of the components is shown in FIG. 1.

Electronic device 100 can include any suitable type of electronic device. For example, electronic device 100 can include a portable electronic device that the user may hold in his or her hand, such as a digital media player (e.g., an iPod™ made available by Apple Inc. of Cupertino, Calif.), a personal e-mail device (e.g., a Blackberry™ made available by Research in Motion of Waterloo, Ontario), a personal data assistant ("PDA"), a cellular telephone, a handheld gaming device, and a digital camera. As another example, electronic device 100 can include a larger portable electronic device, such as a laptop computer. As yet another example, electronic device 100 can include a substantially fixed electronic device, such as a desktop computer.

Control circuitry 102 can include any processing circuitry or processor operative to control the operations and performance of electronic device 100. For example, control circuitry 102 can be used to run operating system applications, firmware applications, media playback applications, media editing applications, or any other application. In some embodiments, control circuitry 102 can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on electronic device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

I/O circuitry 108 can be operative to convert (and encode/decode, if necessary) analog signals and other signals into digital data. In some embodiments, I/O circuitry 108 can also convert digital data into any other type of signal, and vice-versa. For example, I/O circuitry 108 can receive and convert physical contact inputs (e.g., from a multi-touch screen), physical movements (e.g., from a mouse or sensor), analog audio signals (e.g., from a microphone), or any other input. The digital data can be provided to and received from control circuitry 102, storage 104, memory 106, or any other component of electronic device 100. Although I/O circuitry 108 is illustrated in FIG. 1 as a single component of electronic device 100, several instances of I/O circuitry 108 can be included in electronic device 100.

Electronic device 100 can include any suitable interface or component for allowing a user to provide inputs to I/O circuitry 108. For example, electronic device 100 can include any suitable input mechanism, such as for example, a button, keypad, dial, a click wheel, or a touch screen. In some embodiments, electronic device 100 can include a capacitive sensing mechanism, or a multi-touch capacitive sensing mechanism.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronics device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display.

Communications circuitry 110 can include any suitable communications circuitry operative to connect to a communications network and to transmit communications (e.g., voice or data) from electronic device 100 to other devices within the communications network. Communications circuitry 110 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

In some embodiments, communications circuitry 110 can be operative to create a communications network using any suitable communications protocol. For example, communications circuitry 110 can create a short-range communications network using a short-range communications protocol to connect to other devices. For example, communications circuitry 110 can be operative to create a local communications network using the Bluetooth® protocol to couple electronic device 100 with a Bluetooth® headset.

Electronic device 100 can include one more instances of communications circuitry 110 for simultaneously performing several communications operations using different communications networks, although only one is shown in FIG. 1 to avoid overcomplicating the drawing. For example, electronic device 100 can include a first instance of communications circuitry 110 for communicating over a cellular network, and a second instance of communications circuitry 110 for communicating over Wi-Fi or using Bluetooth®. In some embodiments, the same instance of communications circuitry 110 can be operative to provide for communications over several communications networks.

In some embodiments, electronic device 100 can be coupled a host device for data transfers, synching the communications device, software or firmware updates, providing performance information to a remote source (e.g., providing riding characteristics to a remove server) or performing any other suitable operation that can require electronic device 100 to be coupled to a host device. Several electronic devices 100 can be coupled to a single host device using the host device as a server. Alternatively or additionally, electronic device 100 can be coupled to several host devices (e.g., for each of the plurality of the host devices to serve as a backup for data stored in electronic device 100).

In some embodiments, an electronic device (e.g., electronic device 100 of FIG. 1) may include an integrated application operative to interface with a travel system to provide access to different services provided by a travel service provider. As used herein, the term "travel service provider" can refer to an airline, a railroad company, a bus company, a cruise ship company, or to any other suitable travel service provider. In some embodiments, this access to the different travel services can be provided through a single, integrated application of the electronic device. For example, through the integrated application, a user can connect to an airline registration system to allow a user to check-in remotely (e.g., from a taxi on the way to the airport). As another example, the integrated application can provide an arrival notification of a user's arrival to a third party upon the user's arrival at a destination (e.g., when the user's airplane lands). As another example, the integrated application can allow the user to access services available to airline customers, such as airport gate services (e.g., preferred guest lounge and available restaurant options), in-flight services (e.g., in-flight dining and entertainment options), or other services for enhancing a user's airline experience.

In this manner, through an integrated application, a travel service provider can maintain a constant connection between the travel service provider and the user. This can result in changing a user's travel experience from a fragmented and disjointed process to one that is instead seamless and fluid. Also, in addition to airline travel, it is to be understood that a user can make use of a single, integrated application in the context of any other type of travel experience such as, for example, travel by bus, travel by ship, travel by train, travel by car, or travel by any other suitable means, in accordance with other embodiments of the invention.

To interface with the travel system, the integrated application can use any suitable approach. In some embodiments, the electronic device can securely connect to one or more servers associated with the travel service provider. For example, the electronic device can connect with distinct servers associated with ordering services or goods from the travel service provider (e.g., train tickets, in-flight entertainment, etc.). As another example, the electronic device can connect with distinct servers associated with attractions or shops proximate the travel service provider (e.g., restaurants and shops in the airport terminal). When the integrated application has connected to a server, a user may make reservations, purchases, or access information (e.g., buy a pass for an airline's airport lounge) through the integrated application.

Figure 2:
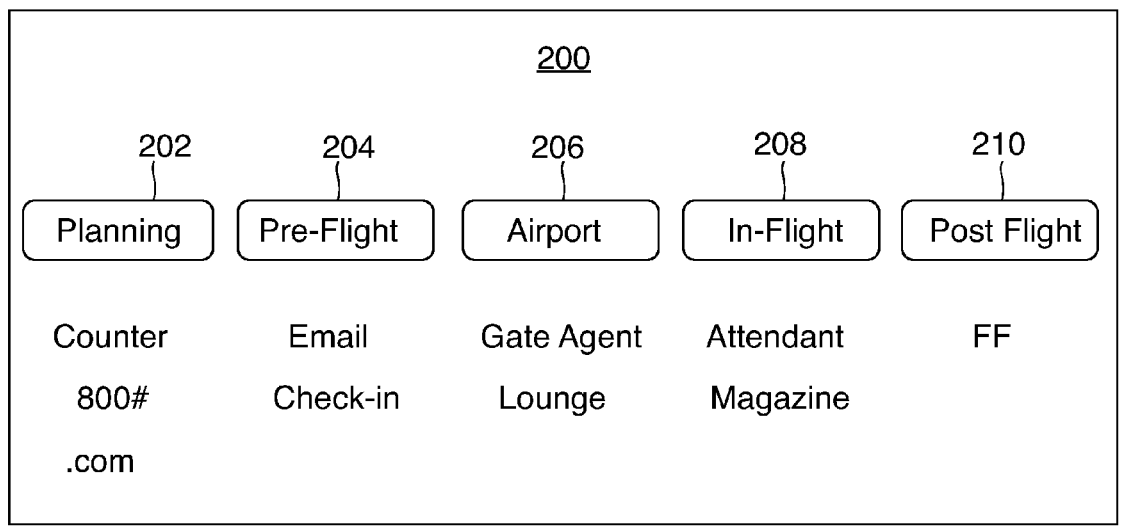
FIG. 2 is a schematic view of several situations during which a user can make use of a single, integrated application in the context of a travel itinerary in accordance with some embodiments of the invention.

Accordingly, through an integrated application of an electronic device, a user can perform different operations to enhance the user's travel experience. FIG. 2 shows diagram 200 of several situations during which a user can make use of a single, integrated application in the context of an airline travel experience in accordance with some embodiments of the invention. Although FIG. 2 is in the context of airline travel, it is to be understood that a user can make use of a single, integrated application in the context of any other type of travel experience, such as train travel, bus travel, car travel, or the like, in accordance with other embodiments of the invention.

As shown in diagram 200, the integrated application could be used in planning scenario 202 while the user is planning a travel itinerary (e.g., while booking one or more airline flights). For example, through the integrated application, a user can access a virtual "counter" to book a reservation and access virtual "800 number" and ".com" information related to various travel service providers (e.g., flights offered, prices, available itineraries, airport layouts, or any other suitable information). As another example, the integrated application can be used in pre-flight scenario 204 before the user's arrival at the initial location of the travel service (e.g., while on the way to the airport) to, for example, allow a user to remotely check-in to their flight or receive e-mails with itinerary updates. The integrated application can be used in airport scenario 206 when the user arrives at the initial location of the travel service provider (e.g., while waiting to board the airplane at an airport). For example, the integrated application can allow the user to access guest lounges, provide gate agent information, or provide any other suitable services. As another example, the integrated application can be used in-flight scenario 208 when the user is traveling. For example, the integrated application can be used to provide entertainment (e.g., a magazine or games) or request flight attendant services. As yet another example, the integrated application can be used in post flight scenario 210 after the user's trip (e.g., after a flight). For example, a user can view, edit, and redeem Frequent Flier miles or other rewards through the integrated application.

Figure 3:
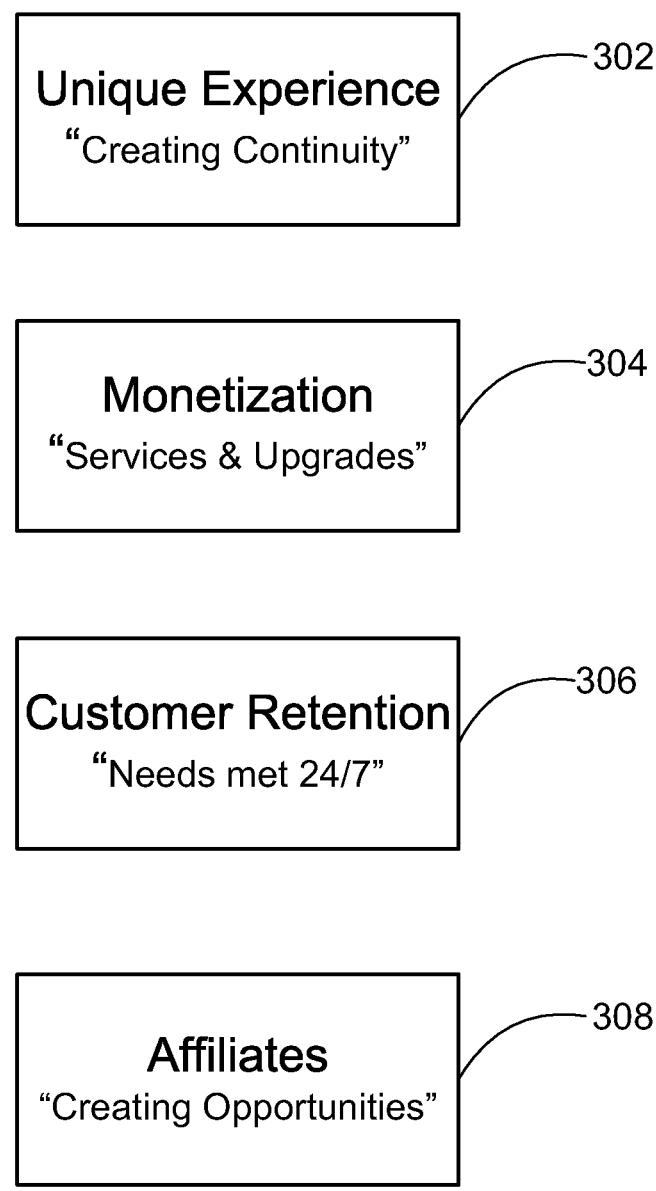
FIG. 3 is a schematic diagram of advantages of an integrated application for enhancing a user's travel experience in accordance with some embodiments of the invention.

Advantages of such a single, integrated application can include, as indicated by diagram 300 of FIG. 3, creating a unique experience 302. For example, the integrated application can control the experience a user associates with a brand (e.g., by creating continuity with a certain travel service provider). Advantages of a single, integrated application may also include monetization 304. For example, upgrades and special services that may be purchased by a user can be conveniently offered through the integrated application. Another advantage can include customer retention 306. For example, the integrated application can build customer relations and promote customer retention (e.g., by addressing a traveler's needs 24 hours a day and 7 days a week to provide the utmost satisfaction). Yet another advantage can include affiliate opportunities 308. For example, since a portable electronic device's simplicity, affordability, and portability may appeal to a broad scope of travelers, a broad scope of travelers may be using the integrated application. Affiliate companies may then be given the opportunity to reach this wide range of travelers through the integrated application. For example, affiliate opportunities such as hiring a tour guide, purchasing tours, hiring a translator, renting cars from a nearby rental agency, and the like can be presented to a user. In this manner, a single, integrated application can control and enhance the user's experience with that travel service provider.

Figure 4:
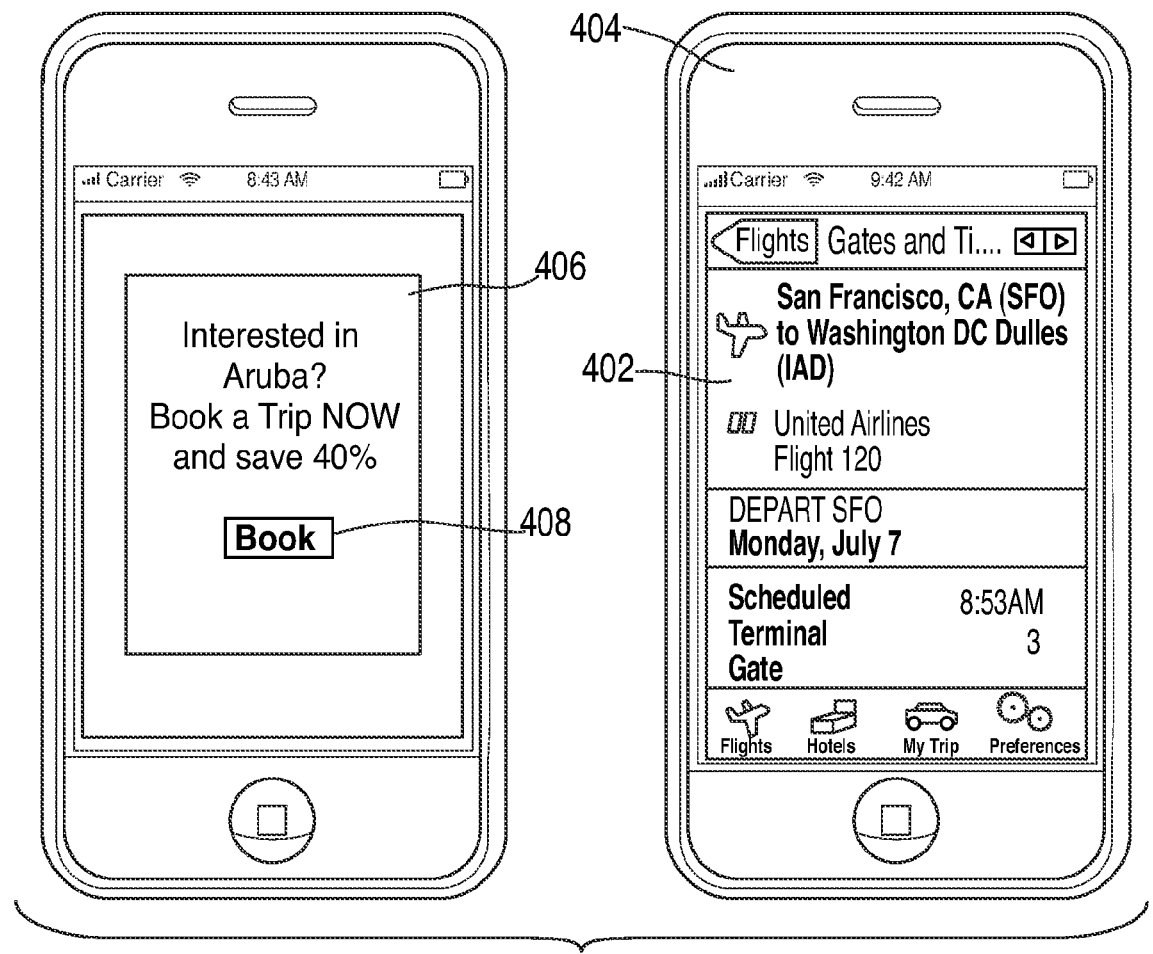
FIG. 4 is a schematic view of functions available to a user while planning a travel itinerary in accordance with some embodiments of the invention.

FIG. 4 shows diagram 400 of functions available to a user while planning a travel itinerary in accordance with some embodiments of the invention. For example, the functions of FIG. 4 may be available to a user during planning scenario 202 of FIG. 2 and may be used to initiate contact with the guest. However, one skilled in the art could appreciate that the functions of FIG. 4 are not limited to a planning scenario or to the particular functions listed in FIG. 4, and rather may include any suitable functions or be used in any suitable scenario.

As generally indicated in diagram 400, a user can research a potential trip. For example, a user can research available airlines, available itineraries, prices, view airport layouts and maps, view destination information, and otherwise research a potential trip. Through the integrated application, a user can book travel arrangements. For example, in some embodiments the integrated application can allow a user to perform secure transactions (e.g., using a credit card) to pay for or reserve a particular travel itinerary.

As is also indicated in diagram 400, a user can create, access, and/or modify travel reservations through the integrated application. For example, interface 402 shows an exemplary interface for allowing a user to access a travel reservation through electronic device 404. Interface 402 is a rendition of a graphical interface used in an application originally provided by Travelocity.com LP of Southlake, Tex. (that is, the "Travelocity" application). This interface is a third-party product provided as an example of many interfaces that could be used to display the travel reservations information discussed herein. Through interface 402, information such as flight number, departure time, arrival time, departure gate, arrival gate, terminal information, local city information, destination city information, terminal maps, or any other suitable information can be provided. Moreover, through the integrated application, a user can enter, view, and modify frequent flier information or other rewards information, (e.g., associate a frequent flier number to a booked airline itinerary), or perform any other suitable operation to customize the user's itinerary.

In some embodiments, a user can receive offers and promotions through the integrated application. For example, while planning a travel itinerary, a user may search a particular travel destination (e.g., Aruba). In response to the user researching this particular destination, the integrated application may then provide special promotions or offers associated with the researched destination. For example, the integrated application can access a database of a travel service providers and search available promotions. The integrated application may then notify the user of promotions matching the researched destination. For example, notification 406 shows an exemplary notification for informing a user of an available promotion matching a searched destination. Notification 406 can be provided in any suitable manner and can include any suitable notification such as, for example, an e-mail, a text message, a voicemail, a pop-up message, a push notification (e.g., a notification that utilizes an internet protocol ("IP") connection to forward notifications from the servers of third party applications to an electronic device), any other suitable notification, or any combination of the above. A user can accept an offer, access more information regarding the offer, or both, through any suitable input such as input 408.

Figure 5:
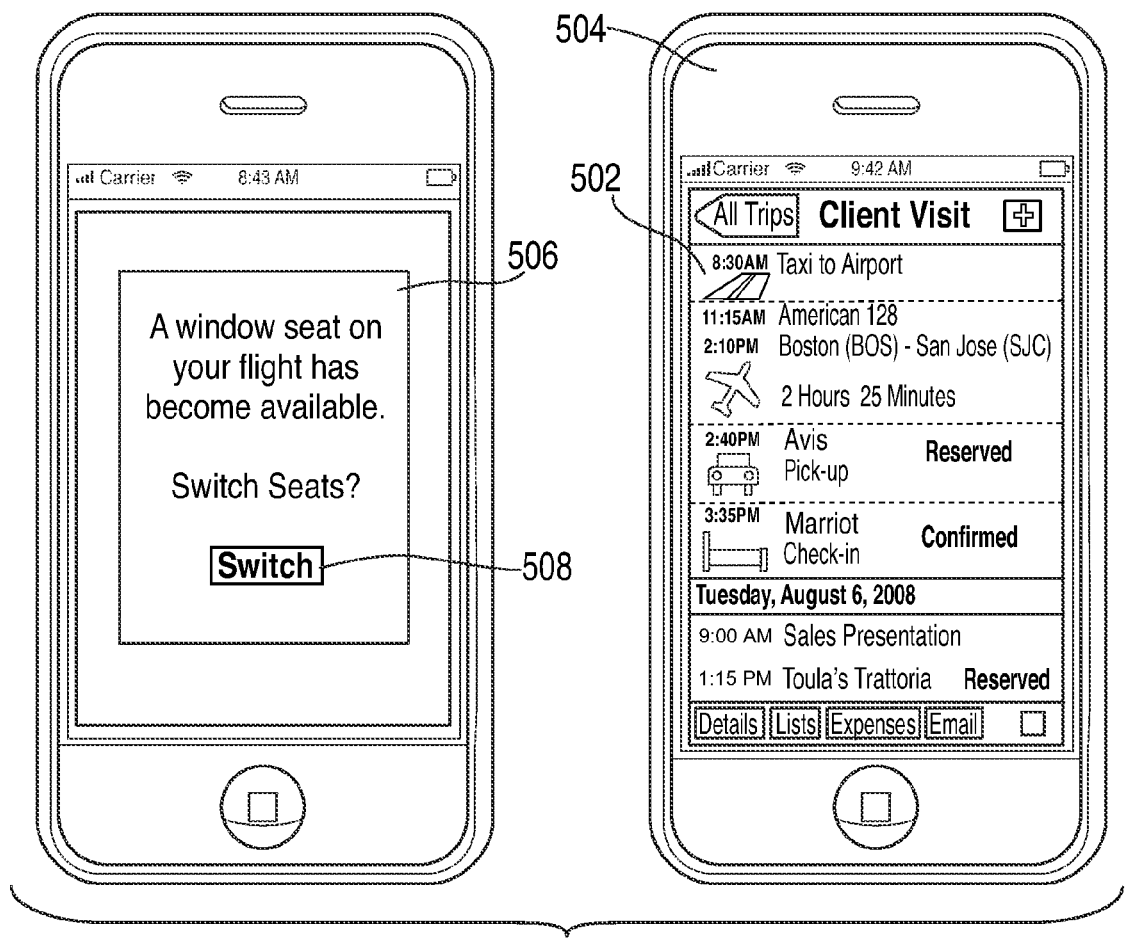
FIG. 5 is a schematic view of functions available to a user before arriving at the initial location of a travel service provider in accordance with some embodiments of the invention.

FIG. 5 shows diagram 500 of functions available to a user before arrival at an initial location of a travel service in accordance with some embodiments of the invention. For example, the functions of FIG. 5 may be available to a user during pre-flight scenario 204 of FIG. 2 and may be used to personalize and add value to a user's travel experience. However, one skilled in the art could appreciate that the functions of FIG. 5 are not limited to a pre-flight scenario or to the particular functions listed in FIG. 5, and rather may include any suitable functions or be used in any suitable scenario.

As indicated in diagram 500, a user can make last-minute changes to a certain travel itinerary. For example, a user may realize while they are in-transit to the travel service provider (e.g., while in a taxi going to the airport) that a change should be made to their itinerary. Through a portable electronic device and integrated application, the user may immediately make the changes to their itinerary, rather than needing to wait until a later point in time (e.g., when the taxi arrives at the airport and the user can speak with a flight agent at the airline counter). Moreover, through the integrated application, a user can view and confirm the details of their itinerary (e.g., confirm the correct gate number). For example, interface 502 shows an exemplary interface for allowing a user to view and confirm a travel itinerary through electronic device 504. Interface 502 is a rendition of a graphical interface used in an application originally provided by Silverware Software of Sudbury, Mass. (that is, the "TravelTracker with TripIt" application). This interface is a third-party product provided as an example of many interfaces that could be used to display the travel itinerary information discussed herein. For example, through an interface such as interface 502, a user can view aspects of their trip such as flight information, car rental information, hotel information, scheduled meetings, scheduled dinners or other meals, and any other information suitable to a travel itinerary.

As is also indicated in diagram 500, through the integrated application, a user can check-in remotely (e.g., while in a taxi on the way to the airport) and can generate a boarding pass ticket. For example, a boarding pass can be downloaded to the user's electronic device. The downloaded boarding pass can include identifying information such as, for example, an optical pattern (e.g., a bar code), a particular signal (e.g., an RFID signal or other near field communication signal), user information (e.g., a photograph of the user, a description of the user, or any other suitable information). The downloaded boarding pass may then be read by a suitable sensor of the airport (e.g., a scanner to read the barcode or a receiver to receive the RFID signal) to authorize the user to, for example, board a plane, pass through security, or the like.

In some embodiments, an integrated application can allow a user to request upgrades, request any other available travel services, or perform any other suitable operation to customize the user's arrival. For example, through the integrated application, a user can request an upgraded service (e.g., a first class seat, a window seat, or any other service). The user may then be notified through the integrated application when the upgraded service is available. For example, notification 506 shows an exemplary notification for informing a user of an available service. A user can accept the available service, view more information regarding the available service, or both through a suitable input such as input 508. Notification 506 can be provided in any suitable manner and can include any suitable notification such as, for example, an e-mail, a text message, a voicemail a pop-up message, a push notification, or any combination of the above. In some embodiments, the integrated application can allow a user to perform secure transactions (e.g., using a credit card) to pay for upgraded services that require additional money (e.g., an upgrade to a first class seat that requires and additional fee).

In some embodiments, available upgrades and notifications, such as notification 506, can be provided to a user automatically from the travel service provider. For example, an airline may have first class seats or other upgrades available for a certain flight. Generally, an airline may offer these available upgrades to preferred members (e.g., travelers who frequently fly with the airline) as a free upgrade. However, offering these seats as a free upgrade can result in the airline potentially losing profits from, for example, travelers who would otherwise be willing to pay for these upgrades. In this case, the airline can transmit a notification offering to sell the upgrade to users who are scheduled to fly on this flight. In this manner, the airline can reduce lost profits by first offering to sell available upgrades to a large group of travelers before these upgrades are given away for free.

In some embodiments, a user can indicate user preferences. The user preferences can include, for example, preferred seating (e.g., window seats, aisle seats, or first class seats), preferred flying times (e.g., morning flights or red-eye flights), preferred meals (e.g., vegetarian or kosher), preferred airports, preferred airlines, or any other suitable preferences. In this scenario, the integrated application can provide a notification to the user when preferred services become available. As one illustration, a user preference can indicate a user prefers window seating. The integrated application may access the user's itinerary (e.g., through an integrated or associated calendar application) and determine, however, that the user is not currently booked in a window seat. The integrated application may then access a server of the airline to determine available seating. In response to a user preference becoming available (e.g., a window seat becomes available), the integrated application can then inform the user of this availability. For example, the user can be informed through a notification such as notification 506 of FIG. 5.

Figure 6:
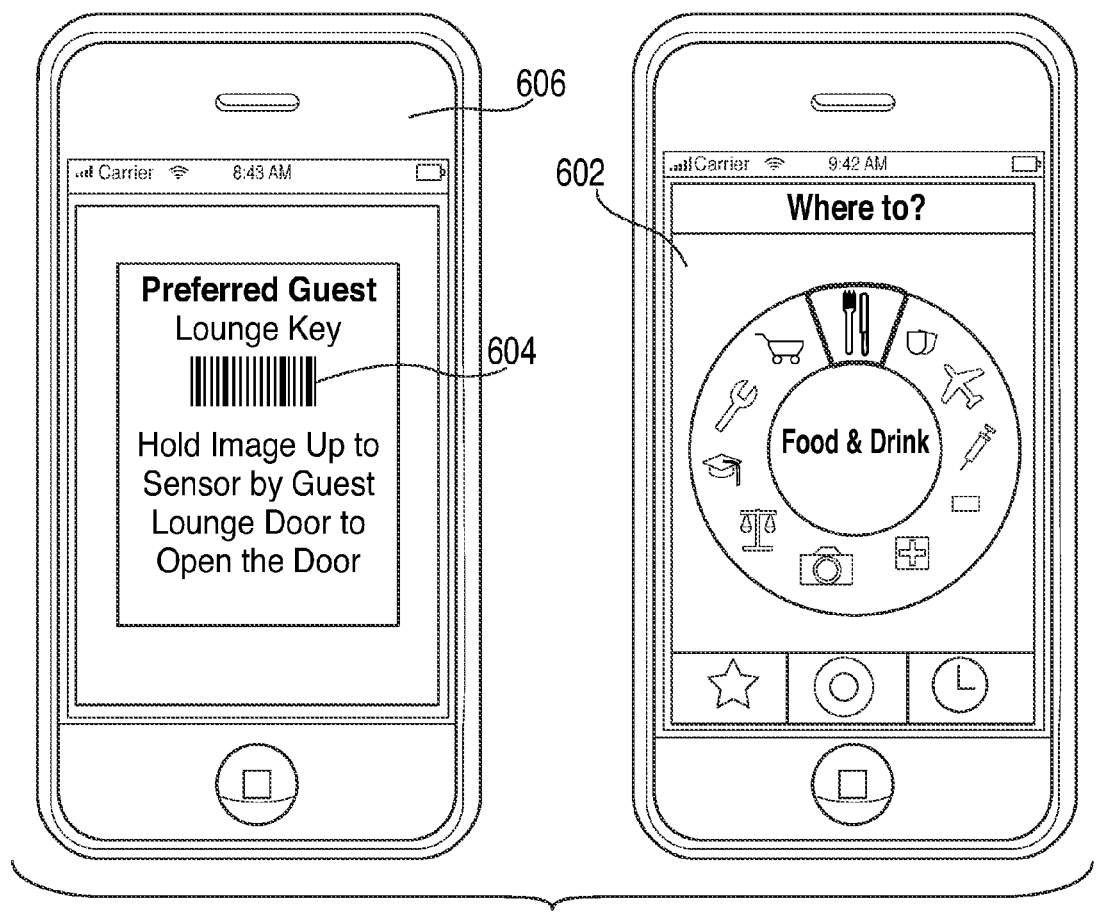
FIG. 6 is a schematic view of functions available to a user once at the initial location of a travel service provider in accordance with some embodiments of the invention.

FIG. 6 shows diagram 600 of functions available to a user upon arriving at the initial location of a travel itinerary (e.g., an airport) in accordance with some embodiments of the invention. For example, the functions of FIG. 6 may be available to a user during airport scenario 206 of FIG. 2. However, one skilled in the art could appreciate that the functions of FIG. 6 are not limited to an airport scenario or to the particular functions listed in FIG. 6, and rather may include any suitable functions or be used in any suitable scenario.

As generally indicated in diagram 600, a user can check-in remotely. For example, an electronic device of the user can connect to and be authenticated by a wireless network provided by the airport or airline (e.g., thus indicating the user has arrived at the airport and is suitable to be checked in). In some embodiments, upon checking-in, a user can receive an electronic boarding pass on their electronic device. As is also indicated in diagram 600, a user can receive transportation security administration ("TSA") information (e.g., security delays, current security alert level, carry-on rules, a listing of acceptable identifications, and other TSA information), and travel notifications (e.g., current gate information and changes, scheduled departure times, delays, and other suitable travel notifications.)

In some embodiments, a user can view available airport services through the integrated application. As used herein, the term "airport services" can refer to any airport amenities and services such as shops, restaurants, ATM's, lounges, shoe-shiners, information desks, and any other suitable airport services. Accordingly, through the integrated application, airport services can be searched for, browsed, viewed, and otherwise listed or presented to the user. For example, an interface such as interface 602 can be provided on a user's electronic device. Interface 602 is a rendition of a graphical interface used in an application originally provided by tap tap tap of the United States but is now provided by FutureTap GmbH of Seefeld, Germany (that is, the "Where To?" application). This interface is a third-party product provided as an example of many interfaces that could be used to display the airport services information discussed herein. Through interface 602, a user can search for and view information on the various airport services available in the airport. In some embodiments, airport services can be prioritized based on their location in the airport (e.g., using an integrated or associated mapping application). For example, the available services can be filtered such that airport services within a certain distance of a user's gate are displayed (e.g., within 1000 feet of the user's gate, or within any other suitable distance). In some embodiments, a map of the airport can be provided that indicates the available airport services. In some embodiments, a user can make restaurant reservations (e.g., over a wireless network, for example without requiring the user to telephone the restaurant) or make purchases through the integrated application (e.g., purchase a desired novel from a nearby shop).

Moreover, promotions associated with airport services can be presented to the user based on the user's location. For example, the location of the user can be determined by a positioning system of the user's electronic device. The positioning system can include any suitable system such as, for example, a global positioning system ("GPS") receiver for accessing a GPS application function call that returns the geographic coordinates (i.e., the geographic location) of the electronic device. As another illustration, the positioning system can utilize any suitable trilateration or triangulation technique to determine the geographic coordinates of the electronic device. In some embodiments, the positioning system can determine various measurements (e.g., signal-to-noise ratio ("SNR") or signal strength measurements) of a network signal (e.g., a cellular telephone network signal, a wireless network access point or "hot spot," or any other suitable network signal) associated with the electronic device to determine its location.

By determining the user's location through the electronic device's positioning system, promotions associated with airport services near the user may be presented to the user. For example, the positioning system can determine the user is nearby an airport service such as a Starbuck's coffee shop. The integrated application may then present a coupon for the Starbuck's coffee shop (e.g., or for any other suitable airport service) to the user, such as a coupon advertising "buy one coffee at Starbucks within the next hour, and get one free!"

In some embodiments, the electronic device can be used as a key to access certain goods or services provided by the travel service provider (e.g., a key to access an airline's airport lounge, a ticket to board a train, etc.). For example, the electronic device can transmit a signal using an appropriate protocol and radio (e.g., a radio-frequency identification ("RFID") signal or other near field communication) to direct a door to be opened or to direct other types of access to be granted. As another example, the electronic device can display a pattern for an optical reader associated with a door or gate. For example, key 604 shows an exemplary optical key that can be displayed by electronic device 606. The electronic device can receive the appropriate electronic key at any suitable time, including for example upon checking-in remotely (e.g., the key is securely transmitted to the electronic device upon checking-in).

As shown in diagram 600, functions related to social networking may also be provided. For example, a user's location can be determined through a positioning system of the user's electronic device. A map of the airport can be then displayed that indicates the location of the user, nearby airport services, or any other suitable map features. The integrated application may also receive data related to the locations of acquaintances or friends who are also in the airport. For example, an acquaintance's electronic device can include a positioning system to determine the acquaintance's location. The acquaintance's electronic device can then transmit this location information to the user's electronic device. In response to determining that an acquaintance is in the nearby vicinity, the integrated application may then provide a notification that the acquaintance is nearby, display a map showing the location of the acquaintance, allow the user to communicate with the acquaintance (e.g., by sending a text message, sending an e-mail, calling the acquaintance on telephone, or communicate with the acquaintance through any other suitable medium), or any combination of the above.

In some embodiments, the integrated application can allow for social networking by aiding a user in locating people with similar interests. For example, the integrated application can include a user profile of information associated with the user. The user profile can include information such as, for example, the user's age, gender, relationship status, interests, food preferences, activity preferences, or any other suitable information. The user profile may then be compared with the user profiles of other travelers within the airport to help the user locate other travelers with matching interests. For example, through the application, travelers in the airport can meet people who may want play games together (e.g., play a game of chess), have dinner together, have a drink at an airport bar together, or can be provided with any other suitable social networking opportunities. As an illustration, this may help a user to pass time while waiting for their airplane to board.

Figure 7:
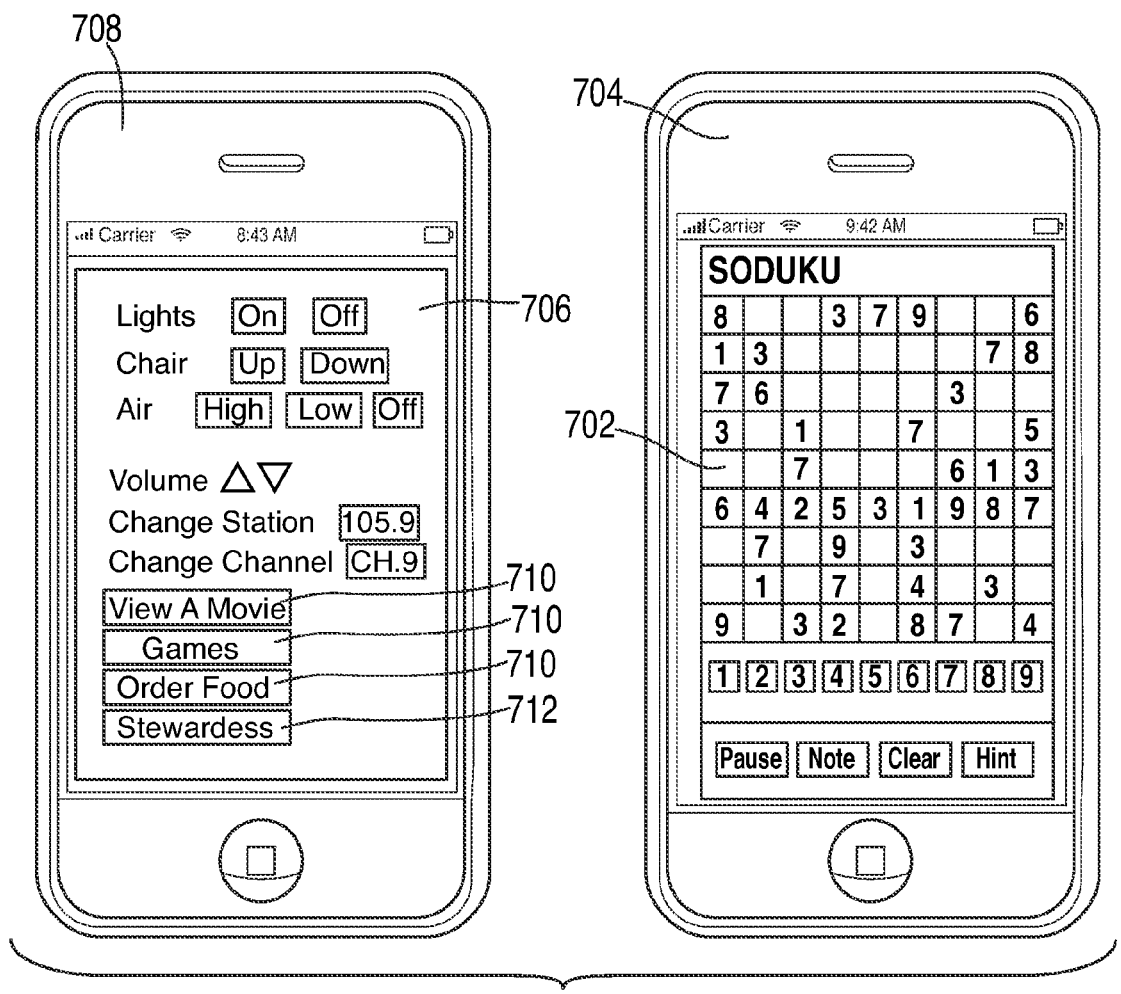
FIG. 7 is a schematic view of functions available to a user during travel in accordance with some embodiments of the invention.

FIG. 7 shows diagram 700 of functions available to a user during travel (e.g., in-flight) in accordance with some embodiments of the invention. For example, the functions of FIG. 7 may be available to a user during in-flight scenario 208 of FIG. 2. However, one skilled in the art could appreciate that the functions of FIG. 7 are not limited to an in-flight scenario or to the particular functions listed in FIG. 7, and rather may include any suitable functions or be used in any suitable scenario.

As shown in diagram 700, a user can control connectivity to in-flight entertainment offered by the travel service provider (e.g., control power, audio, and video available at the traveler's seat, such as from a video console located in the headrest in front of the traveler's seat). In other embodiments, in-flight entertainment (e.g., games, music, videos, movies, and news, such as pre-arrival information) may be transmitted directly to the user's electronic device. For example, the entertainment may be sent over a secure network within the airplane for the user to enjoy directly on the electronic device. For example, interface 702 shows an illustrative interface that can allow a user to enjoy entertainment directly on electronic device 704. Interface 702 is a rendition of a graphical interface used in an application originally provided by Mighty Mighty Good Games of the United States (that is, the "Sudoku" application). This interface is a third-party product provided as an example of many interfaces that could be used to display the in-flight entertainment information discussed herein. The entertainment provided through interface 702 can be a free service provided to the user or can be purchased. When the entertainment can be purchased by the user, the integrated application may allow the user to connect to a secure network to transmit payment information (e.g., credit card information) to the travel service provider.

In some embodiments, the integrated application can connect to a Wi-Fi server of the airplane to allow a user to access on-line functions. For example, through the integrated application, a user can browse the Internet, check e-mail, message or otherwise communicate with other passengers of the airplane or with other people outside of the airplane, or access other suitable on-line functions. Moreover, the airplane can include power jacks or other ports to allow the electronic device to couple to the airplane and, for example, be provided with power or be recharged. In some embodiments, the electronic device can couple to the airplane (e.g., through a suitable port located in the user's seating area) to allow the electronic device to interface with the airplane's IT infrastructure. For example, movies, pictures, games, or other data stored on the electronic device can be displayed on a television screen of the airplane, or otherwise suitably accessed by the airplane's IT infrastructure. As another example, flight announcements, in-flight movies, or other media of the airplane can be played and viewed directly on the user's electronic device.

In some embodiments, the electronic device can be used to interface with a menu providing access to cabin services. As used here, the term "cabin service" refers to services of an airplane accessible from a user's seating area such as, for example, stewardess services (e.g., in-flight food services, in-flight drink services, blanket requests, pillow requests, information requests, or other stewardess requests), in-flight entertainment services (e.g., viewing and ordering movies, listening to music and radio stations, accessing in-flight games, and the like), seating area controls (e.g., light controls, air and temperature controls, seat adjustment controls, radio controls, audio controls, television controls, or other seating area controls), or other cabin services. The menu for accessing cabin services can be displayed directly on the user's electronic device and can interface with the airline's IT infrastructure, as illustrated by menu 706 of electronic device 708. As another example, the menu can be displayed on an in-flight television. In this scenario, the electronic device can serve as a remote controller providing menu selections.

Using the menu (e.g., on the user's electronic device, on a television of the airplane, or both), the user can view and order cabin services items (e.g., movies, games, music, food, drinks, or other suitable cabin service items) through a suitable input, such as input 710. The menu can moreover allow a user to transmit requests for cabin services to an airline's stewardess (e.g., a drink request, an extra blanket request, a pillow request, or any other suitable requests) through an input such as input 712. The cabin services described above can be free services provided to the user or can be available for purchase. Furthermore, as illustrated by menu 706, a user can control light switches, temperature controls, seat adjustments, radio station control, audio controls, video controls, or other fixtures associated with the user's seating area through menu 706.

In some embodiments, the integrated application can provide arrival notifications to a third party of the user. For example, generally, while a user is on an airplane, the user is not allowed to turn on a cellular phone or other electronic devices allowing for wireless communication. Accordingly, a user may be unable to notify a third party of their current flight status or of their arrival at their destination. This may especially be disruptive to a third party when, for example, the third party is waiting for the user's arrival (e.g., they are picking the user up at the airport, timing the preparation of a meal with the user's arrival, or are otherwise dependent upon the user's arrival), and when the user's flight is delayed, cancelled, or otherwise arrives at an unscheduled time. Accordingly, in some embodiments, the integrated application can provide an arrival notification to a third party upon the user's arrival at a destination airport.

The user's arrival at a destination airport can be determined in any suitable manner. For example, in some embodiments, the integrated application can determine that an electronic device running the integrated application was powered off and powered on again. This may correspond to an electronic device being turned off for an airplane's flight and then turned back on when the airplane lands. For example, oftentimes an owner of a cellular phone or other electronic device is accustomed to turning their electronic device back on as soon as the airplane on which they are traveling lands on the ground (e.g., when the flight crew makes the announcement that it is now okay to turn electronic devices back on). In this scenario, the integrated application can determine fairly accurately when a user's plane arrives at its destination by determining when the electronic device is powered back on. Determining a user has landed by monitoring when an electronic device has been powered off and powered back on can thus provide for a convenient and simple system that is easy to implement. For example, this system can be implemented without requiring relatively complex systems such as a global positioning system, a system that communicate with an airport service provider (e.g., to receive updated or real-time information related to flight status), or other relatively complex systems.

In some embodiments, in addition to or instead of determining an electronic device is powered off and then powered back on, the integrated application can perform other functions to confirm the user's airplane has landed. This may, for example, prevent the integrated application from sending an arrival notification in a situation such as when a user turns their phone off and then on, yet has not traveled on an airplane. As one way of confirmation, the integrated application can determine the user was scheduled to travel (e.g., travel by airplane) on the current date. For example, the integrated application can have access to an integrated and/or associated calendar application and may determine a user's schedule through the calendar to application. The integrated application may then confirm that the electronic device was powered on and powered off on a date in which the user was scheduled to travel by airplane.

As another example of confirmation, the integrated application may confirm that the electronic device was powered on and/or powered off in a timeframe that suitably matches the airplane's scheduled departure and landing times. For example, the integrated application can determine that the electronic device was powered off within 10 minutes, within 30 minutes, or within one hour of the airplane's scheduled departure. Similarly, the integrated application can additionally or alternatively determine that the electronic device was powered back on within 10 minutes, within 30 minutes, or within one hour of the airplane's scheduled arrival. The timeframe used to confirm the user's arrival can be a user-set variable, a predetermined variable, or any other suitable variable.

As yet another example of confirmation, the integrated application may use a positioning system to confirm the electronic device is powered back on is a location matching the expected destination. For example, the integrated application can determine the user's expected destination from an integrated or associated calendar application (e.g., the application can see the user is scheduled to travel to San Diego). Upon the electronic device powering back on, the positioning system may determine the current location. The integrated application may then compare the current location to the expected location to determine whether they match. In response to these locations matching, the integrated application can confirm that the user has arrived at their destination airport.

The arrival notification can be transmitted to the third party in any suitable manner. For example, the arrival notification can be sent by a text message, an e-mail, a voice mail, a pop-up notification, a push notification, or by any other suitable manner to a third party's electronic device.

Figure 8A:
FIGS. 8A and 8B are illustrative interfaces associated with arrival notifications in accordance with some embodiments of the invention.

Moreover, the third party to which the arrival notification is sent can be determined in any suitable manner. For example, the user may pre-select a list of third party members to whom the notification can be sent (e.g., by inputting contact information of the third party members into the electronic device, choosing third party members from a contact book, or through any other suitable way). As another example, the integrated application can automatically determine third party members. For example, in some embodiments, the integrated application can access an integrated or associated contact book of the application. The integrated application may then send the arrival notification to suitable members listed in the contact book. For example, the integrated application may send the arrival notification to family members listed in the contact book, to colleagues listed in the contact book, to people listed in the contact book that the user is scheduled to meet (e.g., scheduled to meet in a current travel itinerary listed in the user's calendar), to everyone listed in the contact book, or to any other suitable members listed in the contact book. FIG. 8A shows exemplary arrival notification 800 that can be provided to a suitable third party upon a user's arrival.

Figure 8B:
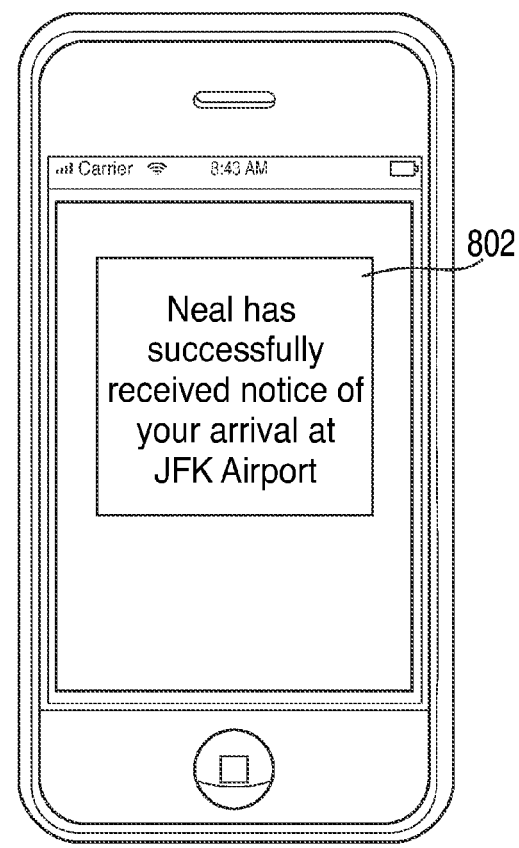

In some embodiments, the user can receive a confirmation that the third party has received the arrival notification. For example, FIG. 8B shows illustrative confirmation 802 informing a user that a third party has received notice of his arrival.

Figure 9:
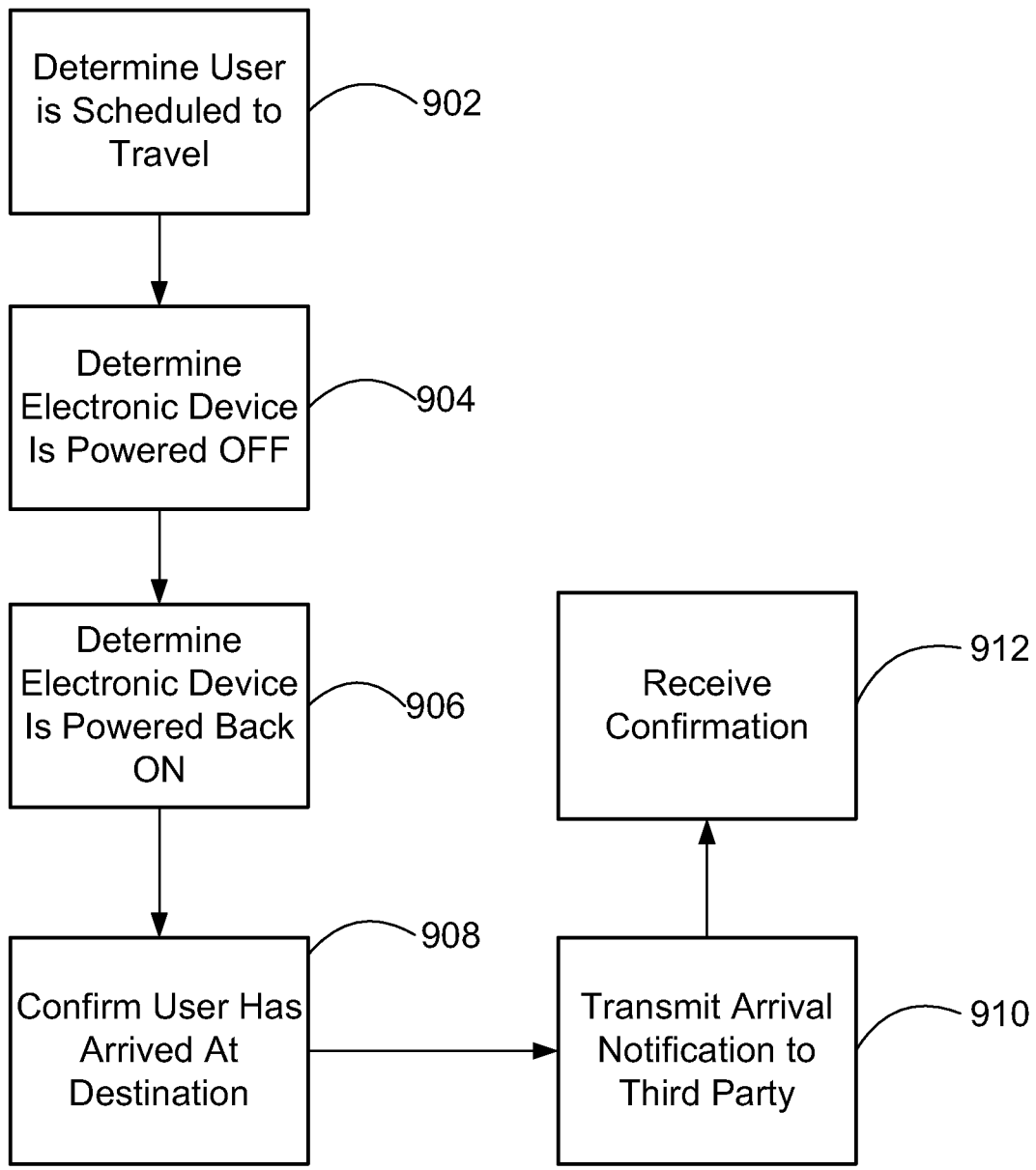
FIG. 9 is an illustrative process for providing a arrival notification in accordance with some embodiments of the invention.

FIG. 9 shows process 900 for providing an arrival notification, such as arrival notification 800 of FIG. 8A. At step 902, process 900 can determine wither the user is schedule to travel. For example, process 900 can determine whether the user is scheduled to travel by airplane on the current date. To make this determination, a calendar of the user can be accessed, the user can manually enter a travel itinerary, or any other suitable way can be used.

At step 904, process 900 can determine the electronic device is powered OFF. This may, for example, indicate the user powered off the electronic device while traveling on an airplane. At step 906, process 900 may then determine the electronic device is powered back ON. This may, for example, indicate the airplane has landed (e.g., thus allowing travelers to turn their electronic devices back on) and that the user has arrived at their destination airport.

At step 908, process 900 can confirm the user has arrived at the destination airport. This may, for example, help to avoid erroneously determining the user has arrived at a destination airport when the user has merely powered their electronic device off and the back on without traveling on an airplane. For example, to make this confirmation, process 900 can compare the user's current location (e.g., determined via a positioning system of the user's electronic device) to the expected destination (e.g., determined via an integrated or associated calendar application) to determine whether they match. As another example, process 900 can determine whether the electronic device was powered on and/or powered off in a timeframe that suitably matches the airplane scheduled departure and landing time. As an illustration, process 900 can determine whether the electronic device was powered off within 10 minutes, 30 minutes, or one hour of the scheduled departure time and/or whether the electronic device was powered on within 10 minutes, 30 minutes, or one hour of the scheduled arrival time.

At step 910, an arrival notification can be transmitted to a third party. For example, an arrival notification such as notification 800 of FIG. 8A can be transmitted. The arrival notification can include a text message, an e-mail, a voice mail, a pop-up notification, a push notification, or any other suitable notification. A user may manually select the third party members to whom the arrival notification is sent by, for example, entering contact information, choosing one or more people from a contact book, or both. In some embodiments, process 900 can automatically determine members of the third party by, for example, accessing an associated or integrated contact book and selected all members of the contact book or a subset of members of the contact book (e.g., family members, work associates, classmates, people with whom the user is schedule to meet, or any other suitable subset).

At step 912, the user can receive a confirmation that the third party has received the arrival notification. For example, a confirmation such as confirmation 802 of FIG. 8B can be received through an electronic device of the user. Similar to the arrival notification, the confirmation can include a text message, an e-mail, a voice mail, a pop-up notification, a push notification, or any other suitable confirmation.

The process discussed above is intended to be illustrative and not limiting. Persons skilled in the art could appreciate that steps of the process discussed herein can be omitted, modified, combined, or rearranged, and any additional steps can be performed without departing from the scope of the invention. For example, in some embodiments, confirmations steps such as step 908 and/or step 902 can be omitted.

Figure 10:
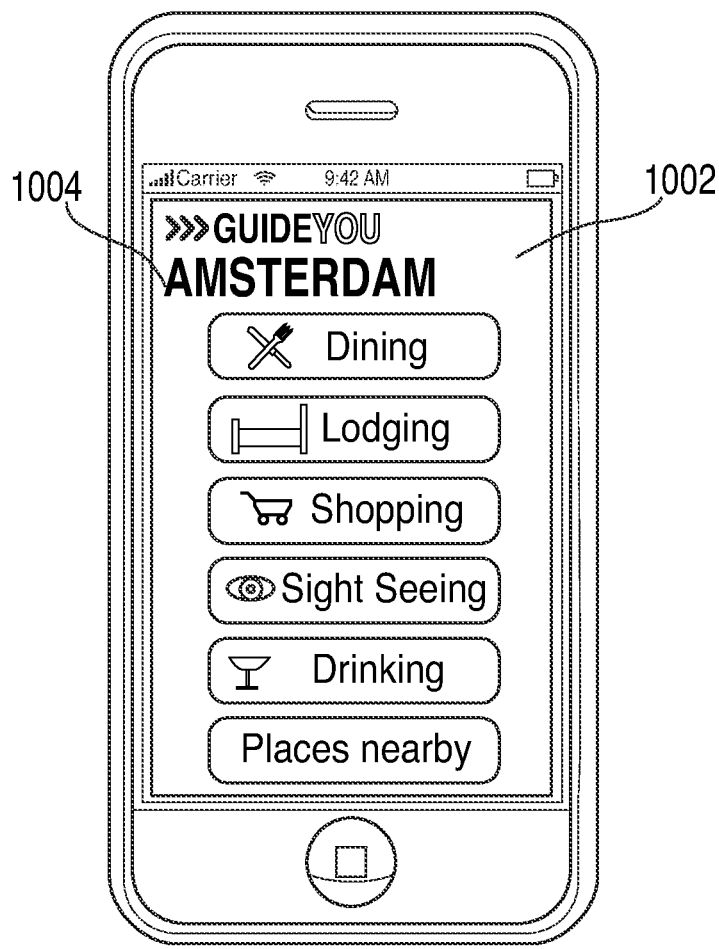
FIG. 10 is a schematic view of functions available to a user following travel in accordance with some embodiments of the invention.

FIG. 10 shows diagram 1000 of functions available to a user after arriving at a travel destination in accordance with some embodiments of the invention. For example, the functions of FIG. 10 may be available to a user during post-flight scenario 210 of FIG. 2 and may "continue the conversation" with a previous traveler. However, one skilled in the art could appreciate that the functions of FIG. 10 are not limited to a post-flight scenario or to the particular functions listed in FIG. 10, and rather may include any suitable functions or be used in any suitable scenario.

As shown in diagram 1000, the user can access destination information. For example, the user can access information about the destination airport (e.g., maps to where luggage, taxis, or rental cars may be found), maps and information regarding nearby shops, hotels, attractions, and other amenities, or other suitable destination information. For example, interface 1002 shows an exemplary interface allowing a user to access destination information regarding destination location 1004. Interface 1002 is a rendition of a graphical interface used in an application originally provided by Comma Publications GmbH & Co. KG of München, Germany (that is, the "GuideYou Amsterdam" application). This interface is a third-party product provided as an example of many interfaces that could be used to display the destination information discussed herein. Through the integrated application, a user may also access transportation information such as information associated with nearby car rental agencies (e.g., addresses, hours of operation, car rental prices, and the like), public transportation (e.g., train information, bus information, taxi information, and the like), and other suitable transportation information.

As is also indicated in diagram 1000, a user can receive and view bounceback offers and offers from affiliate programs. For example, the user can be provided with a coupon to purchase another flight on the same travel service provider, can receive a coupon to rent a car with an affiliated car rental agency, or can receive any other suitable offers through the integrated application. As another example, a user can be provided with an opportunity to enter, view, and modify rewards information (e.g., frequent flier benefits available or gained by the completed travel itinerary). In some embodiments, the electronic device can automatically save and store receipts from the airline and other service providers associated with the user's travel itinerary (e.g., restaurants, transportation, and entertainment) to facilitate the user's post-trip experience. For example, the receipts can be gathered to aid a user in updating their budget or to facilitate the reimbursement of expenses incurred on a business trip.

It will be apparent to those of ordinary skill in the art that methods involved in the invention may be embodied in a computer program product that includes a machine readable and/or usable medium. For example, such a computer usable medium may consist of a read-only memory device, such as a CD ROM disk or conventional ROM device, or a random access memory, such as a hard drive device or a computer diskette, or flash memory device having a computer readable program code stored thereon.

The above-described embodiments of the invention are presented for purposes of illustration and not of limitation.

What is claimed is:

1. A method comprising:
   determining, by a portable electronic device, that a user is scheduled to depart for travel at an expected departure time and arrive to a destination at an expected arrival time from calendar information of the user;
   determining, by the portable electronic device, that the portable electronic device in possession by the user is powered off within a first predetermined amount of the expected departure time;
   determining, by the portable electronic device, the user arrived at the destination by detecting that the portable electronic device has been powered back on within a second predetermined amount of time of the expected arrival time;
   accessing, from a contact book of the user by the portable electronic device, at least one third party recipient; and
   transmitting, by the portable electronic device, an arrival notification of the arrival of the user to the at least one third party recipient based on the determining that the user arrived at the destination.

2. The method of claim 1, wherein determining the user is scheduled to travel to a destination comprises:
   determining the user is scheduled to travel to a destination by airplane.

3. The method of claim 1, wherein each of the determining a user is scheduled to travel, the determining a portable electronic device is powered off, the determining the user has arrived, and the transmitting is integrated into a single application of the portable electronic device.

4. The method of claim 1, wherein determining the user is scheduled to travel to a destination comprises:
   accessing calendar information of the user, wherein the calendar information is stored locally on the portable electronic device.

5. The method of claim 1, wherein determining the user is scheduled to travel to a destination comprises:
   accessing calendar information of the user, wherein the calendar information is stored in a database remote to the portable electronic device.

6. The method of claim 1, wherein the arrival notification comprises one of an e-mail, a text message, a voicemail, a push notification, and a pop-up notification.

7. The method of claim 1, wherein transmitting an arrival notification comprises:
   receiving a listing from the user of at least one recipient;
   transmitting the arrival notification to the at least one recipient.

8. The method of claim 1, wherein transmitting a notification comprises:
   accessing a contact book of the user;
   determining at least one contact from the contact book; and
   transmitting the arrival notification to the at least one contact.

9. The method of claim 8, wherein determining at least one contact from the contact book comprises:
   determining which contacts of the contact book are family members of the user; and transmitting the arrival notification to the family members.

10. The method of claim 1, further comprising:
    receiving a confirmation that the at least one third party recipient has received the arrival notification.

11. The method of claim 10, wherein the confirmation comprises one of an e-mail, a text message, a voicemail, a push notification, and a pop-up notification.

12. An electronic device comprising:
    communication circuitry;
    a storage component operable to store travel itinerary information of a user; and
    control circuitry operable to:
    determine, based on the stored travel itinerary information from calendar information of the user, that the user is scheduled to depart for travel at an expected departure time and arrive to a destination at an expected arrival time;
    determine that the electronic device in possession by the user is powered off within a first predetermined amount of the expected departure time;
    determine that the user arrived at the destination by detecting that the electronic device is powered back on within a second predetermined amount of time of the expected arrival time;
    access, from a contact book of the user by the electronic device, at least one third party recipient; and
    instruct the communication circuitry to transmit an arrival notification to the at least one third party in response to determining the user is scheduled to travel by airplane and determining the user arrived at the destination by detecting the electronic device is powered back on.

13. The electronic device of claim 12, wherein the electronic device comprises a portable electronic device.

14. The electronic device of claim 12, further comprising:
    a positioning system operable to determine the current position; and
    wherein the processor is further operable to:
        determine a destination location based on the stored travel itinerary information;
        determine the current position matches the destination location; and
        instruct the communication circuitry to transmit the arrival notification in response to determining the current position matches the destination location.

15. The electronic device of claim 12, wherein the clock circuitry is further operable to:
    determine a second time corresponding to when the electronic device is powered off; and wherein the processor is further operable to:
        determine a scheduled departure time based on the stored travel itinerary information;
        determine the scheduled departure time is within a second particular timeframe of the second time; and
        instruct the communication circuitry to transmit the arrival notification in response to determining the scheduled departure time is within the second particular timeframe of the second time.

16. The electronic device of claim 12, further comprising:
    a display operable to display an optical pattern for unlocking a door of a travel service provider.

17. The electronic device of claim 12, wherein the communication circuitry is further operable to:
    receive upgrade offers from a server of the travel service provider.

18. The electronic device of claim 17, wherein:
    the storage device is further operable to store user preferences; and
    the processor is further operable to:
        compare the stored user preferences to the received upgrade offers to determine at least one matching upgrade offer; and
        provide the at least one matching upgrade offer to the user.

19. The electronic device of claim 12, further comprising:
an input component operable to receive user selections for controlling at least one cabin service of the airplane.

20. Non-transitory machine-readable media comprising non-transitory machine-readable instructions recorded thereon executable by a processor of a portable electronic device for performing a method of:
determining a user is scheduled to depart for travel at an expected departure time and arrive to a destination at an expected arrival time from calendar information of the user;
determining the portable electronic device in possession by the user is powered off within a first predetermined amount of the expected departure time;
determining the user arrived at the destination by detecting that the portable electronic device has been powered back on within a second predetermined amount of time of the expected arrival time;
accessing, from a contact book of the user by the portable electronic device, at least one third party recipient; and
transmitting an arrival notification of the arrival of the user to the at least one third party recipient based on the determining that the user arrived at the destination.

21. The method of claim 1, further comprising transmitting, using the portable electronic device, an arrival notification of the arrival of the user to at least one third party recipient based on the determining that the user arrived at the destination.

* * * * *